United States Patent
Pinheiro e Mota et al.

(10) Patent No.: US 11,171,904 B1
(45) Date of Patent: Nov. 9, 2021

(54) MESSAGE AUTHENTICATION USING GENERATIVE ADVERSARIAL NETWORKS

(71) Applicant: International Business Machines Corporation, Armonk, NY (US)

(72) Inventors: Helio Leonardo Pinheiro e Mota, Ridgefield, CT (US); Renata Balthazar de Lima Mussauer, Rio de Janeiro (BR); Rosana Rueda Elias, Campinas (BR); Rafael Risso Moleiro, Campinas (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 16/867,714

(22) Filed: May 6, 2020

(51) Int. Cl.
| | |
|---|---|
| *H04L 12/58* | (2006.01) |
| *G06F 3/0488* | (2013.01) |
| *G06N 3/04* | (2006.01) |
| *H04L 29/06* | (2006.01) |
| *G06N 3/02* | (2006.01) |

(52) U.S. Cl.
CPC ............ *H04L 51/18* (2013.01); *G06F 3/0488* (2013.01); *G06F 3/04883* (2013.01); *G06N 3/02* (2013.01); *G06N 3/0454* (2013.01); *H04L 51/046* (2013.01); *H04L 63/08* (2013.01)

(58) Field of Classification Search
CPC ....... H04L 51/18; H04L 51/046; H04L 63/08; G06F 3/0488; G06F 3/04883; G06N 3/02; G06N 3/0454
See application file for complete search history.

(56) References Cited

U.S. PATENT DOCUMENTS

| | | | |
|---|---|---|---|
| 7,702,599 B2 | 4/2010 | Bernard |
| 8,060,915 B2 | 11/2011 | Voice |
| 8,862,092 B2 | 10/2014 | Reitnour |
| 8,892,136 B2 | 11/2014 | Bobotek |

(Continued)

FOREIGN PATENT DOCUMENTS

| | | |
|---|---|---|
| CN | 103957506 B | 12/2017 |
| CN | 108737243 A | 11/2018 |

(Continued)

OTHER PUBLICATIONS

"Discriminative model", Wikipedia, last edited on Mar. 11, 2020, 4 pages, <https://en.wikipedia.org/wiki/Discriminative_model>.

(Continued)

*Primary Examiner* — Azizul Choudhury
(74) *Attorney, Agent, or Firm* — William Hartwell; Andrew D. Wright; Roberts Calderon Safran & Cole, P.C.

(57) ABSTRACT

Authenticating a message by receiving a first message from a source, generating a touch activation matrix from the first message, the touch activation matrix comprising touch-screen data associated with the first message, generating a second message from the touch activation matrix, determining a first legitimacy state by comparing the first message and the second message, determining a second legitimacy state using a discriminator network, determining a categorization for the first message according to the first and second legitimacy states, and sending the categorization for the first message to the source.

20 Claims, 10 Drawing Sheets

(56) References Cited

U.S. PATENT DOCUMENTS

| | | | | |
|---|---|---|---|---|
| 8,988,191 | B2* | 3/2015 | Zhang | G06F 3/045 340/5.82 |
| 2010/0273529 | A1* | 10/2010 | Oh | G06F 3/04883 455/563 |
| 2011/0247067 | A1* | 10/2011 | Hirose | G06F 3/0488 726/19 |
| 2015/0215871 | A1 | 7/2015 | Schillings | |
| 2016/0021534 | A1 | 1/2016 | Ki-Yoong | |
| 2017/0034680 | A1 | 2/2017 | Yoakum | |

FOREIGN PATENT DOCUMENTS

| | | |
|---|---|---|
| CN | 109426430 A | 3/2019 |
| EP | 2458524 A1 | 5/2012 |
| JP | 49920432 B2 | 8/2012 |
| KR | 1020190099156 A | 8/2019 |
| WO | 9703533 A1 | 1/1997 |
| WO | 2018164673 A1 | 9/2018 |

OTHER PUBLICATIONS

"Generative adversarial network", Wikipedia, last edited on Feb. 28, 2020, 5 pages, <https://en.wikipedia.org/wiki/Generative_adversarial_network>.

"Keyword Typo Generator", SEO Book, downloaded from the internet on Mar. 16, 2020, 3 pages, <http://tools.seobook.com/spelling/keywords-typos.cgi>.

"Levenshtein distance", Wikipedia, last edited on Mar. 8, 2020, 5 pages, <https://en.wikipedia.org/wiki/Levenshtein_distance>.

Cimpanu, Catalin, "Telegram rolls out fix for voicemail hack used against Brazilian politicians", ZDNet, Jul. 30, 2019, 9 pages, <https://www.zdnet.com/article/telegram-rolls-out-fix-for-voicemail-hack-used-against-brazilian-politicians/>.

Majeed et al., "Behaviour Based Anomaly Detection for Smartphones Using Machine Learning Algorithm", International Conference on Computer Science and Information Systems (ICSIS'2014), Oct. 17-18, 2014, Dubai (UAE), 7 pages, <https://pdfs.semanticscholar.org/4295/efb3cece6735d123fdc8ea61c362cdc7fe38.pdf>.

Mell et al., "The NIST Definition of Cloud Computing", Recommendations of the National Institute of Standards and Technology, Special Publication 800-145, Sep. 2011, 7 pages.

Ng, Alfred, "Why more people don't use simple two-factor authentication", CNet, Aug. 9, 2018, 8 pages, <https://www.cnet.com/news/why-more-people-dont-use-simple-two-factor-authentication/>.

O'Neill, Patrick Howell, "Most Americans have never heard of multi-factor authentication", Cyberscoop, Nov. 7, 2017, 10 pages, <https://www.cyberscoop.com/two-factor-authentication-duo-security-yubikey/>.

Ong, Thuy, "Over 90 percent of Gmail users still don't use two-factor authentication", The Verge, Jan. 23, 2018, 2 pages, <https://www.theverge.com/2018/1/23/16922500/gmail-users-two-factor-authentication-google>.

Timur, "Levenshtein Distance", PlanetCalc, 2012, 4 pages, <https://planetcalc.com/1721/>.

Weinand et al., "Application of Machine Learning for Channel based Message Authentication in Mission Critical Machine Type Communication", Proceedings of 23th European Wireless Conference (European Wireless 2017), May 19, 2017, 5 pages, <https://ieeexplore.ieee.org/abstract/document/8011338>.

International Search Report and Written Opinion dated Jul. 26, 2021 form PCT Application No. PCT/CN2021/089901.

* cited by examiner

MESSAGE AUTHENTICATION USING GENERATIVE ADVERSARIAL NETWORKS

BACKGROUND

The disclosure relates generally to authenticating the author of a message. The disclosure relates particularly to using neural networks, including generative adversarial networks, to authenticate message authors.

Smartphone use pervades daily life. Increasingly, smartphone applications enable activities sensitive enough in nature to warrant a user authentication step before enabling activities under the application. Communications, e-commerce, and personal finance applications each justify authentication of a user's identity before enabling activities associated with a user's networks and associated accounts. Face-to-face interactions and authentication have been replaced with virtual interactions requiring some form of virtual authentication before proceeding.

Application access may include providing login credentials, a user identification and a password. Malicious actors seek access to user accounts by either physical access to a user's device, or virtual access to accounts by cloning a device or acquiring a user's account access/login information. Two factor authentication increases application access security but is not widely utilized and is also subject to malicious exploitation.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable authenticating the author of a received message.

Aspects of the invention disclose methods, systems and computer readable media associated with authenticating messages by receiving a first message from a source, generating a touch activation matrix from the first message, generating a second message from the touch activation matrix, determining a first legitimacy state by comparing the first message and the second message, determining a second legitimacy state using a discriminator network, determining a categorization for the first message according to the first and second legitimacy states, and sending the categorization for the first message to the source.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., generating a touch activation matrix from a received message, generating a second message from the touch activation matrix, determining a first legitimacy state by comparing messages, using a discriminator network to determine a second legitimacy state, categorizing a message according to the first and second legitimacy states, sending the categorization state according to defined preferences etc.). These solutions are not abstract and cannot be performed as a set of mental acts by a human due to the processing capabilities needed to facilitate message authorship authentication, for example. Further, some of the processes performed may be performed by a specialized computer for carrying out defined tasks related to memory operations. For example, a specialized computer can be employed to carry out tasks related to authenticating the author of a received message or the like.

Aspects of the invention disclose methods, systems and computer readable media associated with authenticating messages by receiving user device touch-to-text data, creating a touch-to-text and a text-to-touch models from the touch-text data, receiving a first message from a source, generating a touch activation matrix from the message, generating a second message from the touch activation matrix, determining a first legitimacy state by comparing the first message and the second message, determining a second legitimacy state using a discriminator network, determining a categorization for the first message according to the first and second legitimacy states, and sending the categorization for the first message to the source.

Aspects of the invention disclose methods, systems and computer readable media associated with authenticating messages by receiving a first message from a source, generating a touch activation matrix from the message, generating a second message from the touch activation matrix, determining a first legitimacy state by comparing the first message and the second message, determining a second legitimacy state using a discriminator network, determining a categorization for the first message according to the first and second legitimacy states, sending the categorization for the first message to the source, and sending the categorization to an improperly attributed message author.

Aspects of the invention disclose methods, systems and computer readable media associated with authenticating messages by receiving a first message from a source, generating a touch activation matrix from the message, generating a second message from the touch activation matrix, determining a first legitimacy state by comparing the first message and the second message according to a defined threshold, determining a second legitimacy state using a discriminator network, determining a categorization for the first message according to the first and second legitimacy states, and sending the categorization for the first message to the source.

Figure 1:
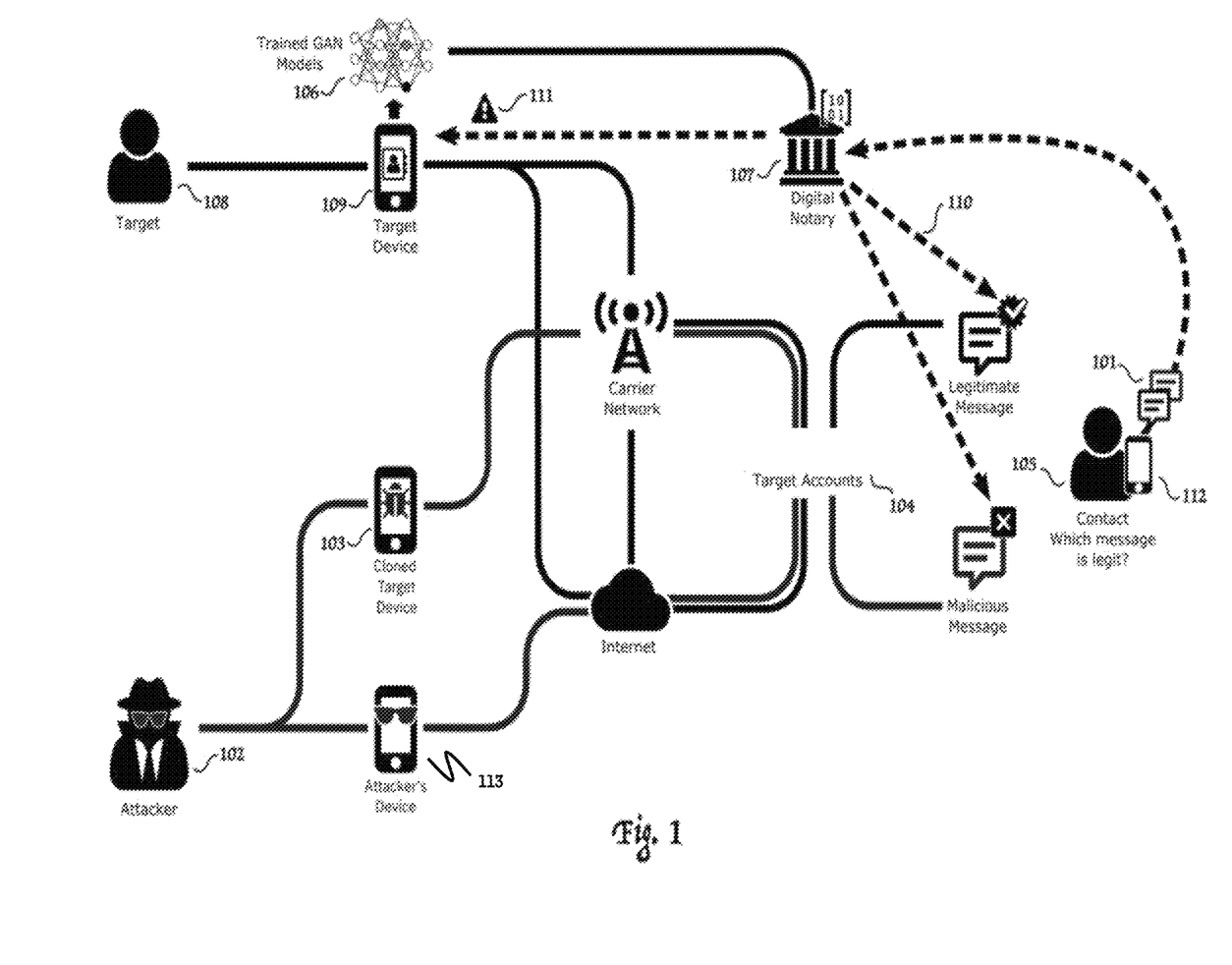
FIG. 1 provides a schematic illustration of a network environment, according to an embodiment of the invention.

FIG. 1 provides a schematic illustration of a communications environment utilizing the disclosed inventions. As shown in the figure, an attacker 102, seeks to impersonate a target 108, using either a hi-jacked target account from the attacker's device 113 or a clone 103 of the target's device, seeking access to one or more of the target's accounts 104, to send a malicious message. The malicious message may seek to utilize assets associated with a target account or to exploit the target account to gain access to other possible targets associated with the target's network.

Concurrent with the actions of the attacker 102, the target 108, sends messages using their device 109, and accessing the same accounts over the same networks as the attacker 102. A recipient 105 receives each of the malicious message from attacker 102, and the legitimate message from target 108, at their device 112, and must determine the authenticity of each message. As shown in the figure, the recipient 105 (source) sends the two received messages to a digital notary 107, for authentication. Digital notary 107, utilizes a previously trained generative adversarial network (GAN) discriminator and trained generating modules 106, to determine message authentication and returns an authenticity categorization 110, for each message to notify the recipient 105.

In an embodiment, recipient's device 112 alters the display of each message to include an indication of the received authentication categorization together with an explanation of the provided categorization. (As shown in the figure, the trained GAN discriminator and generating modules 106 are provided to digital notary 107 by the target's device 109.) In an embodiment, digital notary 107 also sends a warning message 111 to the target's device 109, providing an alert relating to the attempted impersonation.

In an embodiment, recipient's device 112, alters the display of legitimate messages by altering a message border from a neutral color to green, by adding a green or other color check mark or other indicia of legitimacy to the display of the message. In this embodiment, the recipient's device 112, alters the display of a malicious or fake message by altering the border from a neutral color to red, by adding a red "x" or other indicia associated with a malicious message to the display of the message.

Figure 2:
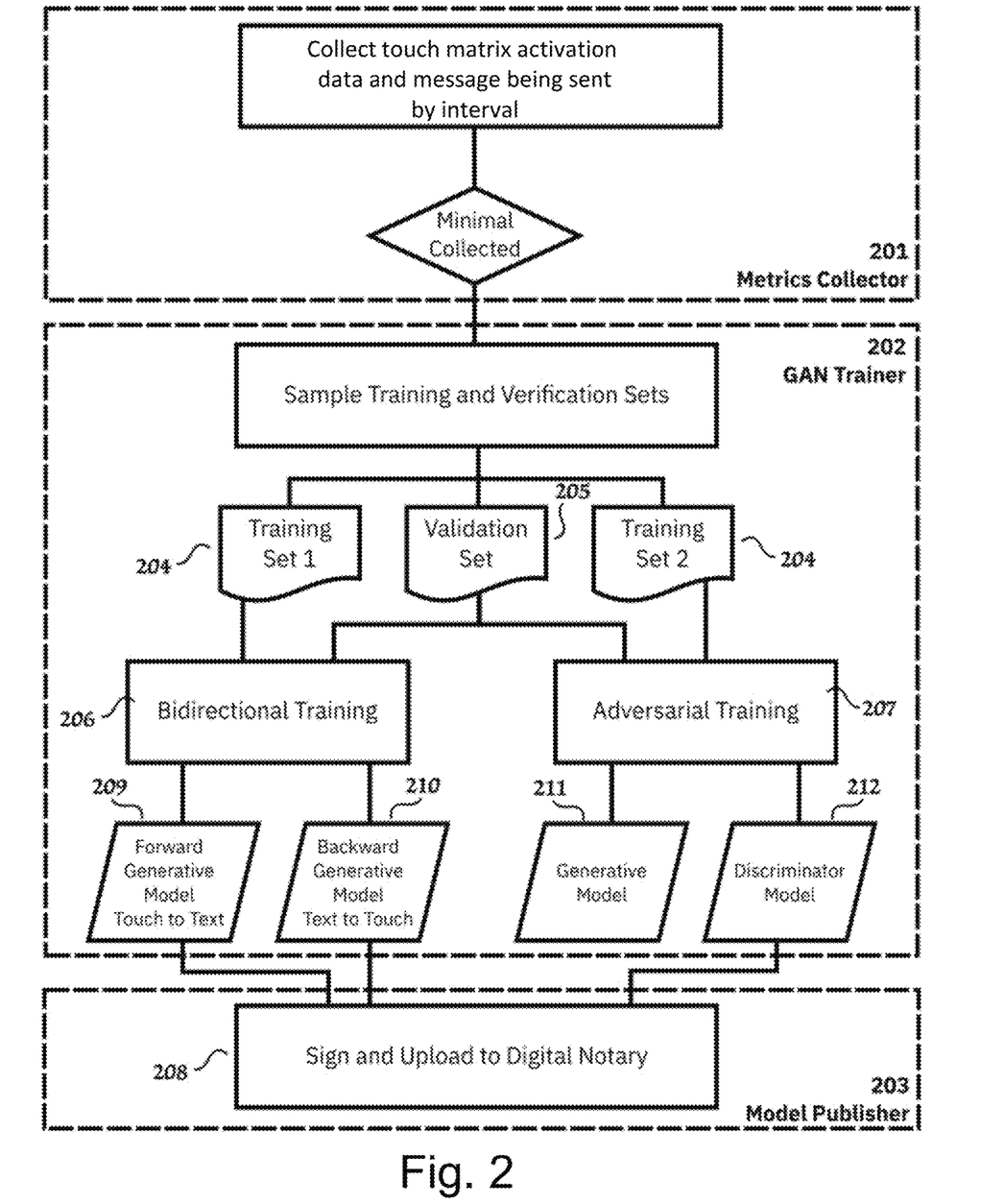
FIG. 2 provides a flowchart depicting an operational model training sequence, according to an embodiment of the invention.

FIG. 2 illustrates operational steps associated with the development and training of the generating modules and GAN discriminator 106 of FIG. 1, used to authenticate messages. As shown in the figure, at Metrics Collector block 201, data metrics including device touch matrix activation data and associated message data are collected from a target device. Touch matrix activation data includes device touchscreen coordinates and touch activation duration times, including capturing user gestures made on the device touchscreen, as well as data regarding what was being displayed at the time—a keyboard, a webpage, etc. In an embodiment, the method captures touchscreen activation matrix data associated with the use of a displayed alphanumeric keyboard to generate a text message. As an example, a user touches their device's touch screen at a location displaying an alphanumeric keypad. The user touches the screen location corresponding to "h-e-l-l-o" and the device touch matrix activation data associated with the keyboard overlay and the characters of hello, together with the exact coordinated touched and touch duration data are recorded. For GAN trainer block 202, the method randomly divides collected touch matrix/text output data into three data sets, two training data sets 204, and one validation data set 205. The method uses a first data set 204 to train a bi-directional generating module 206. The bi-directional generating module 206 includes two distinct generating modules. A first module 209 learns to generate text message outputs from touch matrix data set inputs (touch-to-text). Touch-to-text refers to the generation of a text message from touch screen activation matrix data and an associated alphanumeric keyboard. The model takes touch activation matrix data—including the associated device display keyboard data and generates the alphanumeric character sequences derived from the combination of the touch activation matric data and the keyboard data. The second module 210 learns to generate a touch matrix data set from text message inputs (text-to-touch). Text-to-touch models receive an alphanumeric character string and generate a set of touchscreen activation matrix data for a particular device and display keyboard combination.

In an embodiment, the method uses a second touch-matrix/text output data set to train a GAN. Training the GAN includes adversarial training 207 each of a generating model, or generator 211, and a discriminating model, or discriminator 212. Each of the generator 211 and discriminator 212 includes a neural network architecture having multiple layers of interconnected nodes. Each node has a weighting factor associated with it. The weighting factors are adjusted during the adversarial training phase for the model using back propagation to minimize a defined loss function for the model, or a similar training/weighting adjustment process.

During adversarial training 207, the generator 211 creates output from input data; in an embodiment, the input to the generator 211 includes "noise" such as data from a random or uniform distribution set. The discriminator 212 receives input from each of the training data set 204 and the generator 211 and attempts to classify the input as "real", coming from the training data set, or "fake", coming from the generator 211. During a first phase, or epoch, of GAN training, the node weights of the discriminator 212 are adjusted using back propagation to minimize a defined loss function for the discriminator 212 to correctly identify the real and fake input data. During the first epoch, the node weights of the generator 211 remain fixed.

During a second phase, or epoch, the node weights of the generator are adjusted using back propagation to maximize the discriminator 212 loss function while the discriminator 212 node weights remain fixed. Training progresses alternating between discriminator 212 and generator 211 training until the discriminator node weights yield a 50% success rate—the discriminator successfully identifies real inputs as real and fake inputs as fake 50% of the time while failing to successfully identify the input data of the other 50%. (For a well-trained GAN, the quality of the generated outputs is such that the discriminator cannot effectively distinguish the generated data inputs from real data inputs.)

In an embodiment, the method utilizes the validation data set 205 to validate each of the touch-to-text 209, text-to-touch 210, and discriminator 212 models.

In an embodiment, at model publisher 203, in block 208, after training, each of the touch-to-text 209, text-to-touch 210, and discriminator 212 models are digitally signed by the target 108 and sent from the target's device 109 to the digital notary 107 for use in authenticating messages sent from recipient's device 112.

Figure 3:
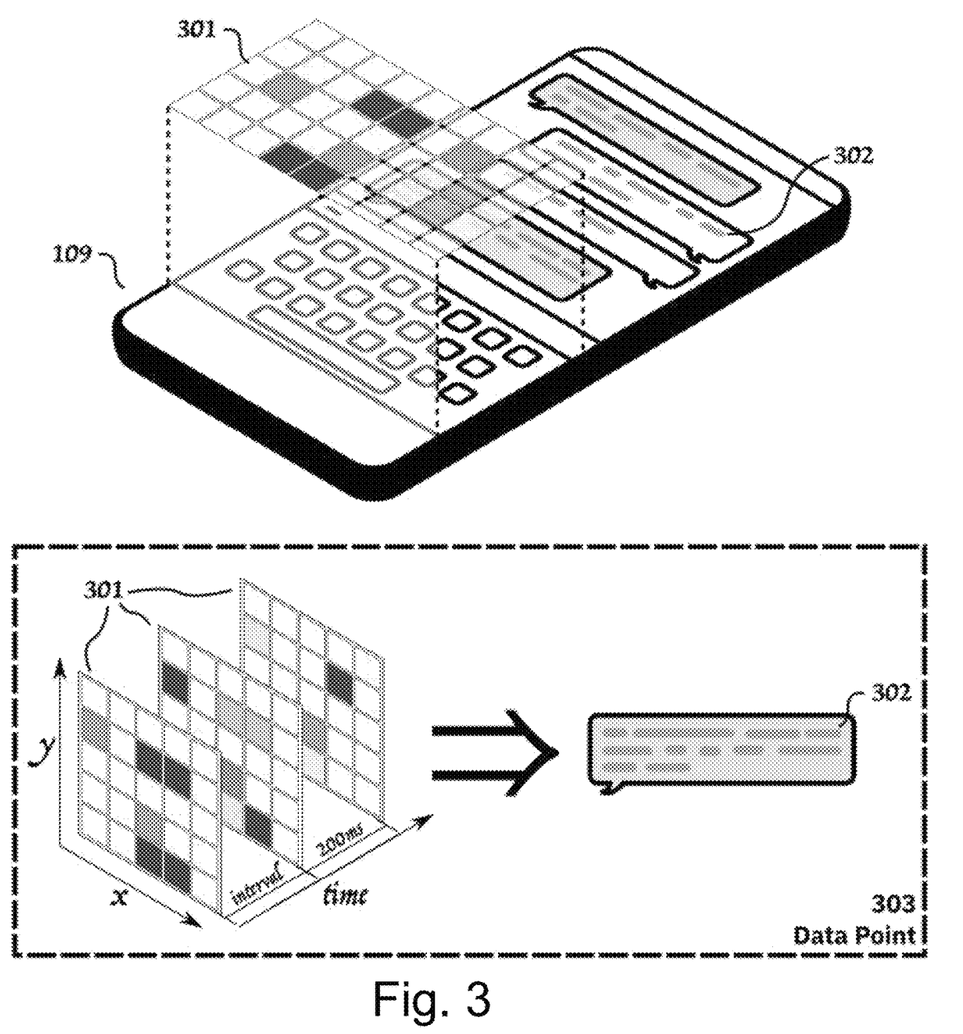
FIG. 3 provides a schematic illustration of touch matrix-message activation data collection, according to an embodiment of the invention.

As shown in FIG. 3, touch matrix activation data includes the touch screen coordinate and activation duration data generated as a target user interacts with their device 109. Touch screen data captures user interactions including individual touches as well as gestures made on the touch screen. The method samples device touch matrix data 301 at predetermined time intervals (such as every 200 millisecond) and associates the touch matrix data with the generated text output 302. Each combination of touch matrix data and the associated text message output constitutes data collected by the method.

Figure 4:
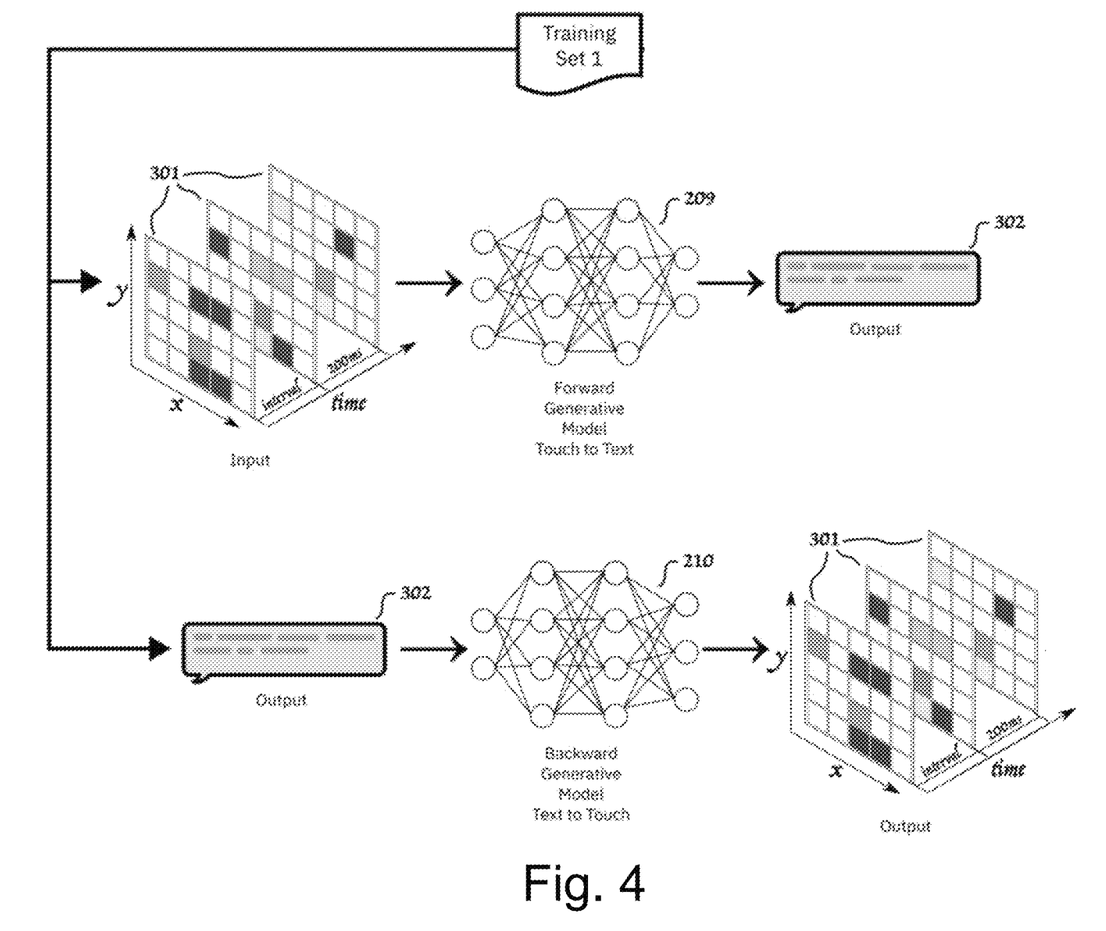
FIG. 4 provides a diagram depicting an operational generative model training sequence, according to an embodiment of the invention.

As shown in FIG. 4, the first training data set 204 provides touch matrix data as an input 301 to the forward generative touch-to-text model 209 yielding text message outputs 302. As shown in the figure, training data set 204 provides text message data 302 as an input to backward generative text-to-touch model 210 yielding touch matrix data 301 as its output.

Figure 5:
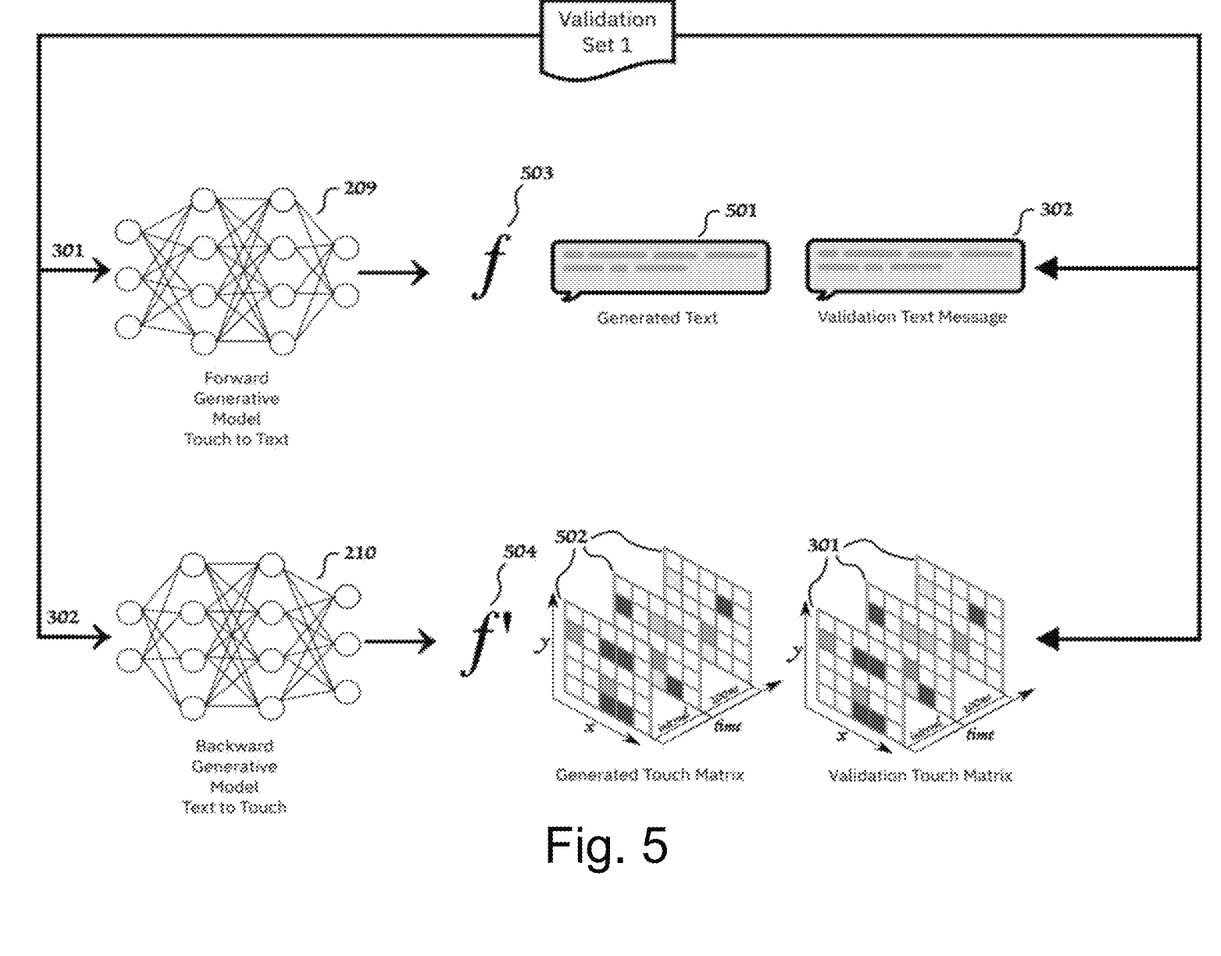
FIG. 5 provides a diagram depicting an operational generative model validation sequence, according to an embodiment of the invention.

FIG. 5 illustrate validation of the touch-to-text 209 and text-to-touch 210 models. As shown in the figure, validation data set 1 provides touch matrix data 301 to touch-to-text model 209. The method then compares touch-to-text model 209 generated text message 501 output with the original text message 302 associated with the touch matrix data 301 using a cost function 503. The method optimizes the touch-to-text model using a genetic algorithm and the same cost function 503 used for the comparison as an indication of the touch-to-text model's fitness.

In an embodiment, training and use of the neural network for classifying messages requires a way to measure the differences between two messages. In this embodiment, the method determines the difference between messages according to the Levenshtein distance algorithm. Other cost function may be used to measure the difference between messages.

In this embodiment, the Levenshtein distance F(m), refers to the number of edits needed to convert a source text to a target text. A cost of "0" indicates no edits are needed, source and target texts are identical. Costs greater than "0" indicate degrees of difference—greater numbers indicating greater differences.

Table 1 provides two examples. Each example includes a received message and a message generated using the text-to-touch and touch-to-text models. The table also includes the Levenshtein distance for each pair of messages. As shown in the table the first example has a Levenshtein distance of 8 while the second example has a distance of 16, indicating that the second set of messages are less similar than the first set.

TABLE 1

| Received message | Generated message | Levenshtein distance |
| --- | --- | --- |
| I am stuck at the mal lwith a flat tire. Can you come pikc me up?? | am s6uck at the mall with a flt ttire. Can yoou come pikc me up?? | 8 |
| My tire is flat. Come pick my up now in teh mall. | My ttire is flt. Can pikc me up in the mal | 16 |

(received message typographic errors are intentional)

As shown in FIG. 5, validation of the text-to-touch model 210 includes passing test message data 302 from the validation data set 1 to the text-to-touch model 210. The validation also includes comparing the text-to-touch model 210 generated touch matrix 502 output with the original touch matrix data 301 using cost function 504. Text to touch model 210 optimization includes using a genetic algorithm and cost function 504 to optimize the comparison of the model output and original data and as an indication of the text-to-touch model's fitness.

Figure 6:
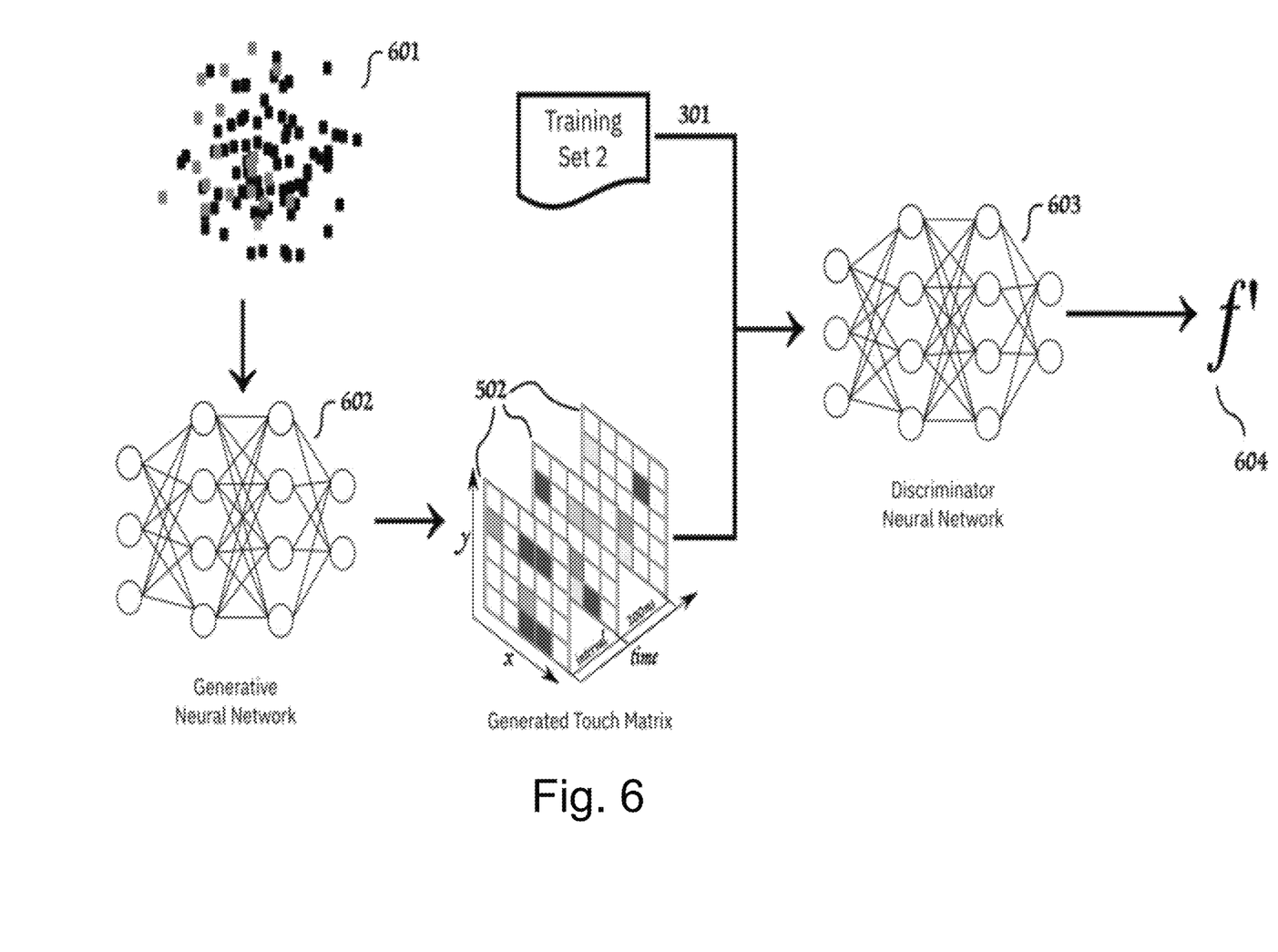
FIG. 6 provides a diagram depicting an operational generative adversarial network training sequence, according to an embodiment of the invention.

FIG. 6 illustrates the training of the GAN according to an embodiment of the invention. As shown in the figure, noise is provided as an input to generator 602. Generator 602 produces a generated touch matrix 502 output according to the noise input 601. Discriminator 603 receives touch matrix data 301 input from training data set 2, or generated touch matrix data 502 from generator 602, and classifies the input as either real, from the data set, or fake, from the generator according to the network node weights of the discriminator. Discriminator node weights are adjusted busing back propagation to minimize a defined loss function 604, as described above.

Figure 7:
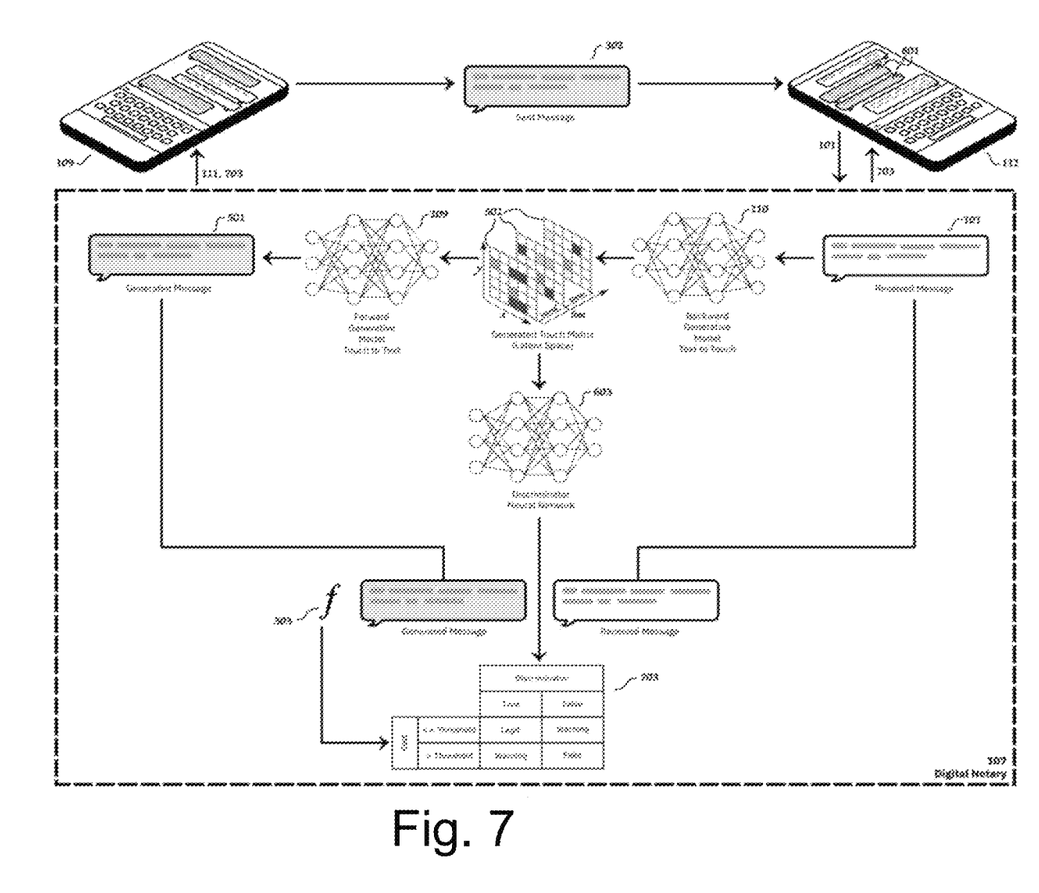
FIG. 7 provides a diagram depicting an operational digital notary authentication sequence, according to an embodiment of the invention.

FIG. 7 depicts operational steps carried out by a digital notary 107 upon receipt of a message and request for authentication. As shown in the figure, recipient device 112 uploads a message to digital notary at block 710. Received message 101 passes to each of the bi-directional network models 209, 210, and to cost function 503. Text to touch model 210 generates touch matrix data which passes to each of the discriminator network 603, and the touch-to-text model 209. Touch-to-text model 209 generates a text message and passes it to cost function 503 for comparison with the original received message 101. Cost function 503 utilizes user defined threshold values to categorize the message comparison as an indicator that the message is above or below the threshold indicting authenticity. The threshold defines the tolerance level that the method will classify a message as legitimate given the result of the cost function 503 metric of the message. The user is in control of the threshold, in effect, allowing the system to be more sensitive to nuances in writing but more likely to misclassify a message. The threshold is used during training of the discriminator network 603 and during classification of the bi-directional module 203.

Threshold levels can be given as an absolute target, i.e., Levenshtein distance less than 10, or as a percentile target, i.e., Levenshtein distance is within the 90th percentile of already classified legit messages, in which case the absolute target value is defined dynamically at each classified message.

Table 2 provides examples of the application of an absolute threshold value of 10 to the examples of Table 1.

TABLE 2

| Received Message | Levenshtein Distance | Absolute Threshold | Class |
|---|---|---|---|
| I am stuck at the mal lwith a flat tire. Can you come pikc me up?? | 8 | <10 | Legit |
| My tire is flat. Come pick my up now in teh mall. | 16 | <10 | Fake |

(received message typographic errors are intentional)

The generated message and cost function 503 results are saved and may be provided to the authentication requestor as part of an explanation of the authentication categorization results. As shown in the figure, discriminator network 603 categorized the touch matrix data as either real or fake. The neural network of the discriminator 603 does not provide transparency to the classification decision. The classifications from each of the bi-directional network 203 and the discriminator 603 must be combined to yield a final classification result.

Table 3 illustrates the combination of the classification of the bi-directional and discriminator classification results for each of the examples of Table 1.

TABLE 3

| Received Message | Bi-directional Network (NB) | Discriminator Network (ND)* | Final Result |
|---|---|---|---|
| I am stuck at the mal lwith a flat tire. Can you come pikc me up?? | Legit | Legit | Legit |
| My tire is flat. Come pick my up now in teh mall. | Fake | Fake | Fake |

(received message typographic errors are intentional)

At block 703, the first legitimacy indicator from the cost function 503, and the second legitimacy indicator from the discriminator 603 are combined to yield a final categorization. As shown in the figure, the cost function result provides that the message comparison lies above a defined threshold or lies at or below the threshold. The discriminator output indicates that the message is either true (real) or false (fake). In combination to the two inputs yield a four-category matrix. True and at or below the threshold=legitimate; true and above the threshold=potentially legitimate; false and at or below the threshold, potentially fake; and false and above the threshold, fake.

In an embodiment, digital notary 107 provides the final categorization of the message 101 to the recipient's device 112. The final result may be displayed together with the message 101 or the display of message 101 may be altered to provide an indication of the final categorization—real messages displayed as green text, with a green border or upon a green background, fake message in red text, with a red border or upon a red background, potentially real and potentially fake message with yellow text, a yellow border, or yellow background, etc.

In an embodiment, user preferences associated with the use of the digital notary by targets and recipients include setting a preference regarding alerts of failed attempts to impersonate a target. In this embodiment, when recipient and target setting indicate approval of alerts, a target of an impersonation attempt receives a message from the digital notary indicating that a message attempting to impersonate the target was received and failed authentication by the digital notary. Control over the sending of such an alert may lie in the setting of the recipient, the target or both.

Figure 8:
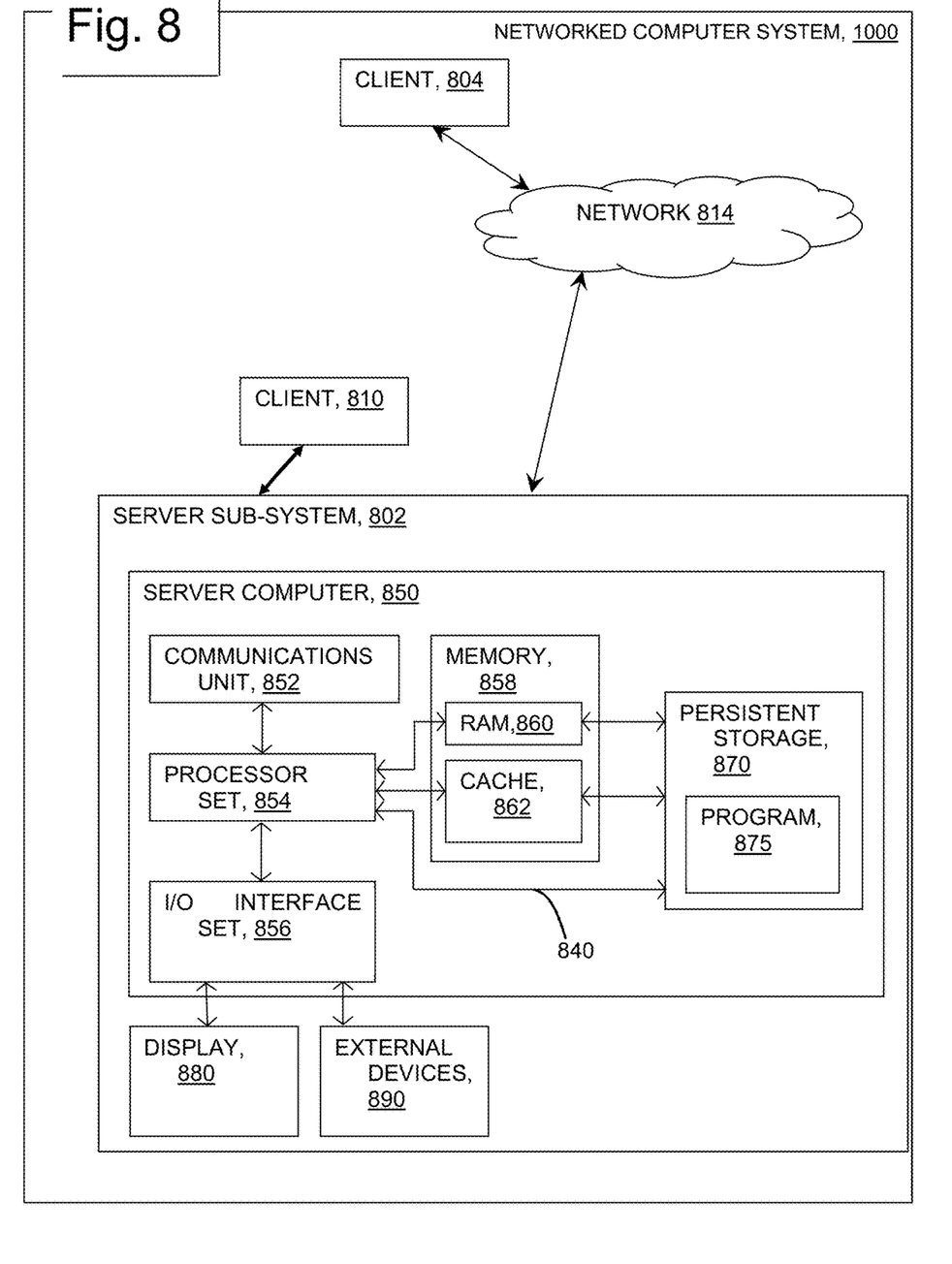
FIG. 8 provides a schematic illustration of a computing system environment, according to an embodiment of the invention.

FIG. 8 provides a schematic illustration of exemplary network resources associated with practicing the disclosed inventions. The inventions may be practiced in the processors of any of the disclosed elements which process an instruction stream. As shown in the figure, a networked Client device 810 connects wirelessly to server sub-system 802. Client device 804 connects wirelessly to server sub-system 802 via network 814. Client devices 804 and 810 comprise message authentication program (not shown) together with sufficient computing resource (processor, memory, network communications hardware) to execute the program. As shown in FIG. 8, server sub-system 802 comprises a server computer 850. In an embodiment, client devices 804 and 810 represent target and recipient devices 112 and 109. Server computer 850 represents digital notary 107. FIG. 8 depicts a block diagram of components of server computer 850 within a networked computer system 1000, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

Server computer 850 can include processor(s) 854, memory 858, persistent storage 870, communications unit 852, input/output (I/O) interface(s) 856 and communications fabric 840. Communications fabric 840 provides communications between cache 862, memory 858, persistent storage 870, communications unit 852, and input/output (I/O) interface(s) 856. Communications fabric 840 can be implemented with any architecture designed for passing data and/or control information between processors (such as microprocessors, communications and network processors, etc.), system memory, peripheral devices, and any other hardware components within a system. For example, communications fabric 840 can be implemented with one or more buses.

Memory 858 and persistent storage 870 are computer readable storage media. In this embodiment, memory 858 includes random access memory (RAM) 860. In general, memory 858 can include any suitable volatile or non-volatile computer readable storage media. Cache 862 is a fast memory that enhances the performance of processor(s) 854 by holding recently accessed data, and data near recently accessed data, from memory 858.

Program instructions and data used to practice embodiments of the present invention, e.g., the message authentication program 875, are stored in persistent storage 870 for execution and/or access by one or more of the respective processor(s) 854 of server computer 850 via cache 862. In this embodiment, persistent storage 870 includes a magnetic hard disk drive. Alternatively, or in addition to a magnetic hard disk drive, persistent storage 870 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 870 may also be removable. For example, a removable hard drive may be used for persistent storage 870. Other examples include optical and magnetic disks, thumb drives, and smart cards that are inserted into a drive for transfer onto another computer readable storage medium that is also part of persistent storage 870.

Communications unit 852, in these examples, provides for communications with other data processing systems or devices, including resources of client computing devices 804, and 810. In these examples, communications unit 852 includes one or more network interface cards. Communications unit 852 may provide communications through the use of either or both physical and wireless communications links. Software distribution programs, and other programs and data used for implementation of the present invention, may be downloaded to persistent storage 870 of server computer 850 through communications unit 852.

I/O interface(s) 856 allows for input and output of data with other devices that may be connected to server computer 850. For example, I/O interface(s) 856 may provide a connection to external device(s) 890 such as a keyboard, a keypad, a touch screen, a microphone, a digital camera, and/or some other suitable input device. External device(s) 890 can also include portable computer readable storage media such as, for example, thumb drives, portable optical or magnetic disks, and memory cards. Software and data used to practice embodiments of the present invention, e.g., message authentication program 875 on server computer 850, can be stored on such portable computer readable storage media and can be loaded onto persistent storage 870 via I/O interface(s) 856. I/O interface(s) 856 also connect to a display 880.

Display 880 provides a mechanism to display data to a user and may be, for example, a computer monitor. Display 880 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
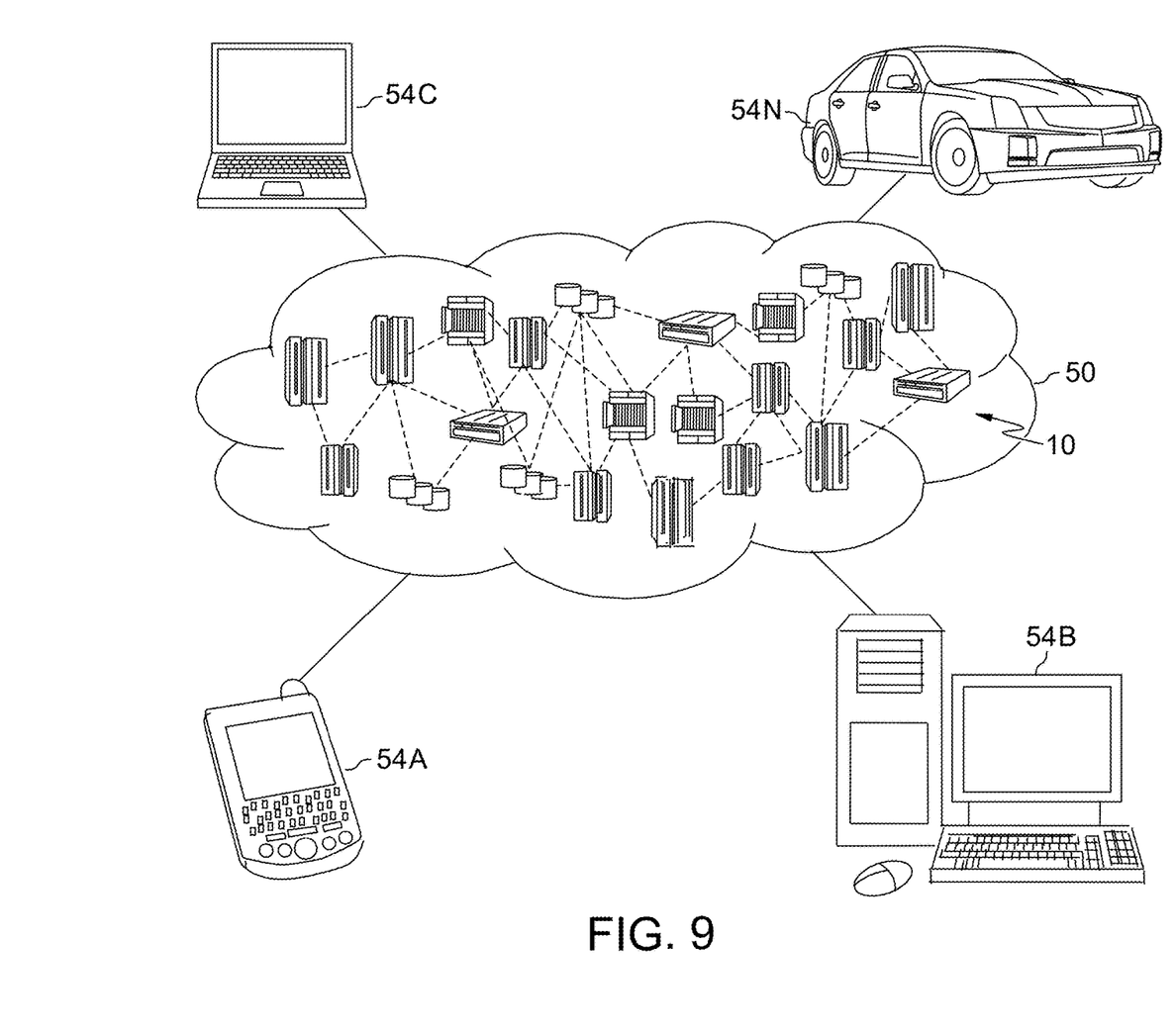
FIG. 9 depicts a cloud computing environment, according to an embodiment of the invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
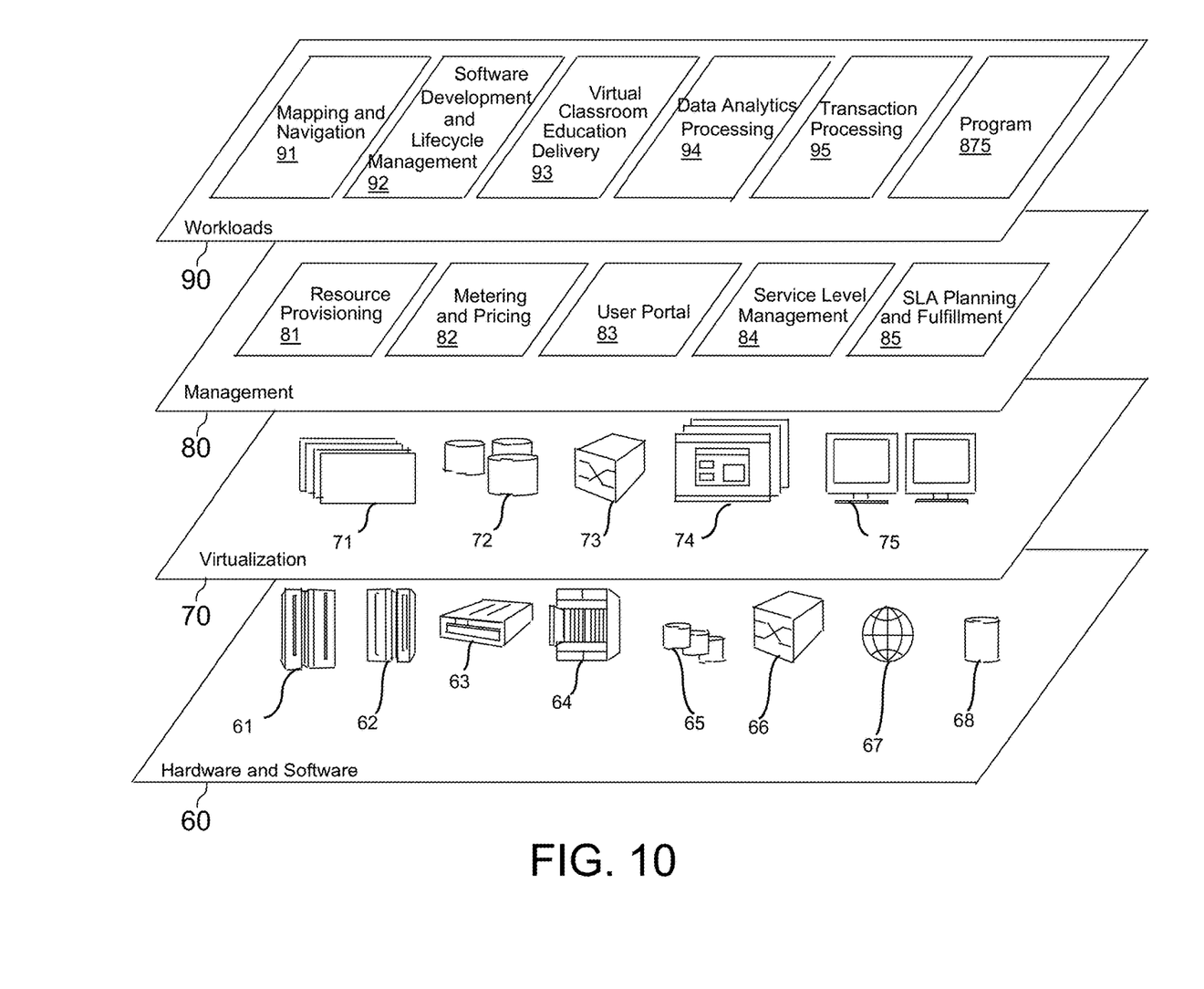
FIG. 10 depicts abstraction model layers, according to an embodiment of the invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message authentication program 875.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for message authentication, the method comprising:

receiving, by one or more computer processors, a first message from a source;

generating, by the one or more computer processors, a touch activation matrix from the first message, the touch activation matrix comprising touchscreen data associated with the first message;

generating, by the one or more computer processors, a second message from the touch activation matrix;

determining, by the one or more computer processors, a first legitimacy state for the first message by comparing the first message and the second message;

determining, by the one or more computer processors, a second legitimacy state for the first message using a discriminator network; determining, by the one or more computer processors, a categorization for the first message according to the first and second legitimacy states; and sending, by the one or more computer processors, the categorization for the first message to the source.

2. The computer implemented method according to claim 1, further comprising notifying an author of the categorization of the first message.

3. The computer implemented method according to claim 1, further comprising:

receiving a touch activation matrix generating model from a message author; and generating the touch activation matrix using the touch activation matrix generating model.

4. The computer implemented method according to claim 1, further comprising:

receiving a message generating model from a message author; and generating the second message using the message generating model.

5. The computer implemented method according to claim 1, wherein the discriminator network comprises a portion of a generative adversarial network pair trained using message author data.

6. The computer implemented method according to claim 1, further comprising saving a cost function result associated with comparing the first and second messages and sharing the cost function result with the source.

7. The computer implemented method according to claim 1, wherein categorizing the first message comprises categorizing the first message as one of legitimate, fake, potentially legitimate, and potentially fake.

8. A computer program product for message authentication, the computer program product comprising one or more computer readable storage devices and program instructions collectively stored on the one or more computer readable storage devices, the stored program instructions comprising:
   program instructions to receive a first message from a source;
   program instructions to generate a touch activation matrix from the first message, the touch activation matrix comprising touchscreen data associated with the first message;
   program instructions to generate a second message from the touch activation matrix;
   program instructions to determine a first legitimacy state by comparing the first message and the second message;
   program instructions to determine a second legitimacy state using a discriminator network;
   program instructions to determine a categorization for the first message according to the first and second legitimacy states; and
   program instructions to send the categorization for the first message to the source.

9. The computer program product according to claim 8, the stored program instructions further comprising program instructions to notify an author of the first message categorization.

10. The computer program product according to claim 8, the stored program instructions further comprising:
    program instructions to receive a touch activation matrix generating model from a message author; and
    program instructions to generate the touch activation matrix using the touch activation matrix generating model.

11. The computer program product according to claim 8, the stored program instructions further comprising program instructions to receive a message generating model from a message author.

12. The computer program product according to claim 8, wherein the discriminator network comprises a portion of a generative adversarial network pair trained using message author data.

13. The computer program product according to claim 8, the stored program instructions further comprising program instructions to save a cost function result associated with comparing the first and second messages and program instructions to share the cost function result with the source.

14. The computer program product according to claim 8, wherein program instructions to categorize the first message comprise program instructions to categorize the first message as one of legitimate, fake, potentially legitimate, and potentially fake.

15. A computer system for message authentication, the computer system comprising:
   one or more computer processors;
   one or more computer readable storage devices; and
   stored program instructions on the one or more computer readable storage devices for execution by the one or more computer processors, the stored program instructions comprising:
      program instructions to receive a first message from a source;
      program instructions to generate a touch activation matrix from the first message, the touch activation matrix comprising touchscreen data associated with the first message;
      program instructions to generate a second message from the touch activation matrix;
      program instructions to determine a first legitimacy state by comparing the first message and the second message;
      program instructions to determine a second legitimacy state using a discriminator network;
      program instructions to determine a categorization for the first message according to the first and second legitimacy states; and
      program instructions to send the categorization for the first message to the source.

16. The computer system according to claim 15, the stored program instructions further comprising program instructions to notify an author of the first message categorization.

17. The computer system according to claim 15, the stored program instructions further comprising:
    program instructions to receive a touch activation matrix generating model from a message author; and
    program instructions to generate the second message using the message generating model.

18. The computer system according to claim 15, the stored program instructions further comprising program instructions to receive a message generating model from a message author.

19. The computer system according to claim 15, wherein the discriminator network comprises a portion of a generative adversarial network pair trained using message author data.

20. The computer system according to claim 15, the stored program instructions further comprising program instructions to save a cost function result associated with comparing the first and second messages and program instructions to share the cost function result with the source.

* * * * *